April 3, 1962     L. E. FAY III     3,028,092

HALL EFFECT RESOLVER

Filed Dec. 31, 1958

INVENTOR.
LOUIS E. FAY III
BY
ATTORNEY

United States Patent Office 3,028,092
Patented Apr. 3, 1962

3,028,092
HALL EFFECT RESOLVER
Louis E. Fay III, Oxford, Mich., assignor to The Bendix Corporation, a corporation of Delaware
Filed Dec. 31, 1958, Ser. No. 784,341
7 Claims. (Cl. 235—189)

This invention relates to a resolver or computer device.

It is known that when a current is passed through a semiconductor crystal subjected to a magnetic field, a voltage is induced in the crystal which is a function of its angle of disposition with respect to the direction of the magnetic field. This phenomenon is known as the Hall effect.

In accordance with this invention, two identical, semiconductor crystals are mounted on a rotatable shaft in a uniform magnetic field so that the current axes of the crystals are parallel to the axis of the shaft and the voltage axes of the crystals are mutually perpendicular and perpendicular to the shaft axis. This device, as will be hereinafter described, can be effectively used to transform the variables "$r$" and "$\theta$" of the polar coordinate system to the corresponding variables "$x$" and "$y$" of the Cartesian coordinate system.

An object of this invention is to provide a resolver or computer device which depends for its operation on the Hall effect.

Other objects, and advantages will become apparent from the following detailed description and from the appended drawings and claims.

Figure 1:
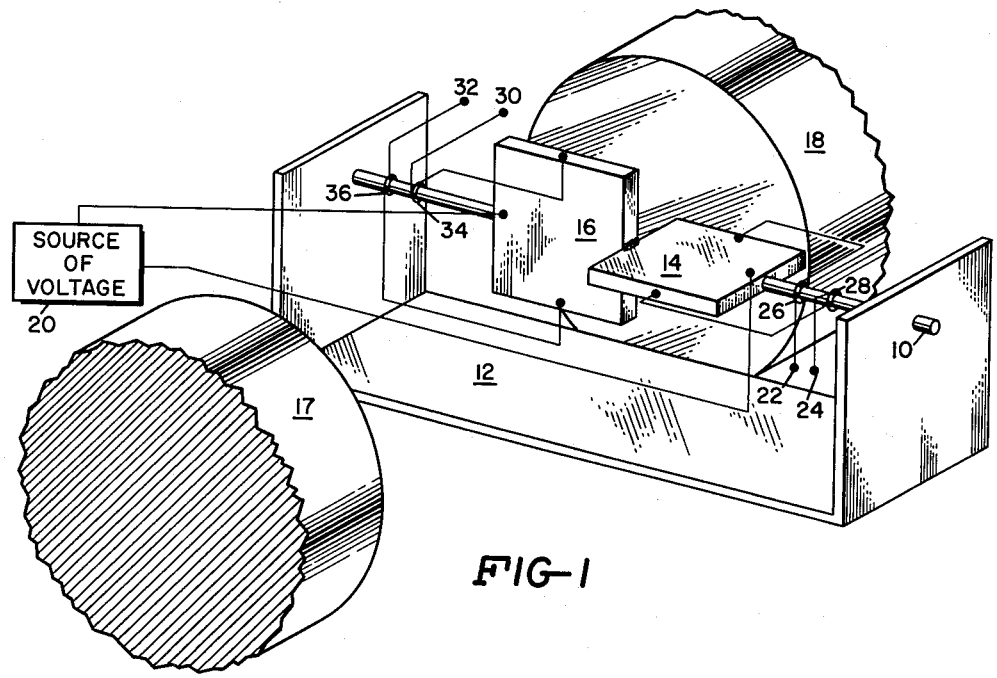
FIGURE 1 is a perspective view, in somewhat schematic form, showing a resolver constituting one embodiment of this invention.

In FIGURE 1, a shaft 10 is journalled into the uprights of a support member 12. A pair of identical crystals 14 and 16, made of a semiconductor material such as germanium, are mounted on the shaft 10 in perpendicular relationship with respect to each other for rotational movement with the shaft. The crystals 14 and 16 are disposed in a uniform magnetic field provided by the pole pieces 17 and 18 of a permanent magnet.

Adjacent ends of the crystals 14 and 16 are connected together such as by solder. The opposite ends of the crystals are connected to a source of voltage 20 to produce a current flow through the crystals in series in a direction parallel to the axis of the shaft 10. The opposite sides of the crystal 14 are connected to output terminals 22 and 24 through slip rings 26 and 28 and the opposite sides of the crystal 16 are connected to output terminals 30 and 32 through slip rings 34 and 36.

The voltage produced by the crystal 14 between the terminals 22 and 24 is expressed as follows:

$$V_{14}=K_{14}I_{14}H_{14} \tag{1}$$

where $K$ = a constant over a limited range depending on the geometry and material of the crystal and the temperature.
$I_{14}$ = the current through the crystal 14.
$H_{14}$ = the effective magnetic field to which the crystal 14 is subjected.

Similarly, the voltage produced by the crystal 16 is expressed as follows:

$$V_{16}=K_{16}I_{16}H_{16} \tag{2}$$

The effective magnetic fields $H_{14}$ and $H_{16}$ are expressed by the following equations:

$$H_{14}=H_{max} \cdot \sin \theta \tag{3}$$

$$H_{16}=H_{max} \cdot \sin(\theta+90°)=H_{max} \cdot \cosine \theta \tag{4}$$

where $H_{max}$ = the maximum field to which a crystal may be subjected. This occurs when the crystal is perpendicular to the field as is the crystal 16 in FIGURE 2.
$\theta$ = the angle of rotation of the shaft from a zero position as shown in FIGURE 3.

The voltages produced by the crystals can now be expressed as follows:

$$V_{14}=K_{14}I_{14}H_{max} \sin \theta \tag{5}$$

$$V_{16}=K_{16}I_{16}H_{max} \cos \theta \tag{6}$$

Figure 2:
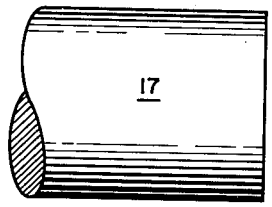
FIGURES 2 and 3 are schematic end views of the resolver in FIGURE 1.
Figure 2:
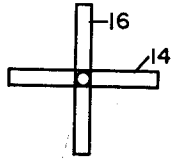
Figure 2:
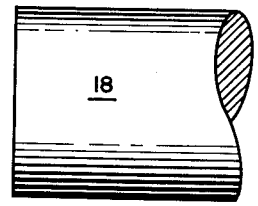
Figure 3:
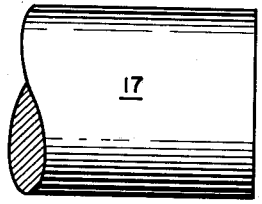
Figure 3:
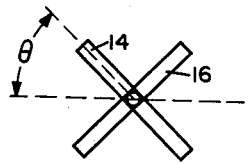
Figure 3:
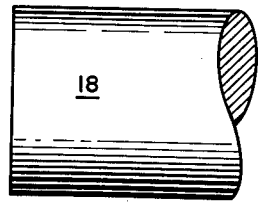

In the position of the crystals 14 and 16 in FIGURE 2, $V_{14}=0$ since $\theta=0$ and $\sin 0°=0$. However, $V_{16}$ is at a maximum value since $\cos 0°=1$. The voltages $V_{14}$ and $V_{16}$, therefore, vary as functions of the angle $\theta$ determined by the rotation of the shaft 10.

In a polar coordinate system, if the variable "$\theta$" is represented by the shaft rotation as indicated, and the variable radius vector "$r$" is represented by the function of the crystal current, the crystal Hall voltages become $$V_{14}=r \sin \theta=y \tag{7}$$

$$V_{16}=r \cos \theta=x \tag{8}$$

where $x$ and $y$ are the variables of the Cartesian coordinate system. Equations 7 and 8 are derived from Equations 5 and 6 wherein $K_{14}I_{14}H_{max}=K_{16}I_{16}H_{max}$ since the current through the crystals is the same and the crystals are identical in construction. With an input to rotate the shaft 10 representing the variable "$\theta$" and the current input through the crystals representing the variable "$r$," we obtain output voltages $V_{14}$ and $V_{16}$ representing the variables "$y$" and "$x$," respectively, in the Cartesian coordinate system.

It can thus be seen that the resolver disclosed above would be very useful as a computer device. It is very simple in construction and reliable in its operation.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A resolver including means for providing a magnetic field, a shaft being oriented in said magnetic field so that it has a component perpendicular to said magnetic field, a first crystal of semiconductor material being mounted relative said shaft, a second crystal of semiconductor material being mounted relative said shaft, means for passing a current through each crystal to produce in each crystal a voltage which is a function of the current and of the angle of disposition of the crystal with respect to the magnetic field, said crystals being mounted relative said shaft so that rotation of said shaft will change the voltage output of said crystals, said crystals being mounted relative one another so that their maximum voltage outputs are achieved at different shaft positions in said magnetic field.

2. The resolver of claim 1 wherein said magnetic field is uniform.

3. The resolver of claim 1 wherein said crystals are in contact with one another, the means for producing current through the crystals comprises a contact from a voltage source from the side of one crystal opposite to the contact point to the side of the other crystal opposite said contact point.

4. The resolver of claim 1 wherein said shaft is substantially perpendicular to the magnetic field, the planes of the crystals pass through the shaft axis, said crystal being rotatable with said shaft, one of said crystals being angularly displaced about said shaft axis relative to the other of said crystals.

5. The resolver of claim 4 wherein said angular displacement between said crystals is 90°.

6. The resolver of claim 1 wherein the crystals are of uniform thickness and geometrically symmetrical about their axis of rotation.

7. The resolver of claim 1 with electrical contacts being made to each crystal along a line substantially perpendicular to the direction of current flow, the contacts for one crystal being made to a first pair of slip rings on said shaft and contacts for the other crystal being made to a second pair of slip rings on said shaft.

References Cited in the file of this patent

UNITED STATES PATENTS 2,864,924     Mayer _____ Dec. 16, 1958

OTHER REFERENCES

"Fundamental Principles of Transistors," Evans, 1957, London, Heywood and Company, Ltd. (Copy in the Scientific Library and in Div. 23, FIG. 27, page 44 of interest.)